(12) United States Patent
Toyota et al.

(10) Patent No.: US 10,995,935 B2
(45) Date of Patent: May 4, 2021

(54) PHOSPHOR AND METHOD FOR PRODUCING SAME

(71) Applicant: Panasonic Intellectual Property Management Co., Ltd., Osaka (JP)

(72) Inventors: Kei Toyota, Osaka (JP); Shinnosuke Akiyama, Okayama (JP); Masato Mori, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/639,549

(22) PCT Filed: Dec. 3, 2018

(86) PCT No.: PCT/JP2018/044330
§ 371 (c)(1),
(2) Date: Feb. 14, 2020

(87) PCT Pub. No.: WO2019/150747
PCT Pub. Date: Aug. 8, 2019

(65) Prior Publication Data
US 2020/0408385 A1 Dec. 31, 2020

(30) Foreign Application Priority Data
Jan. 30, 2018 (JP) .............................. JP2018-013442

(51) Int. Cl.
*F21V 9/32* (2018.01)
*C09K 11/02* (2006.01)
(Continued)

(52) U.S. Cl.
CPC ................ *F21V 9/32* (2018.02); *C09K 11/02* (2013.01); *C09K 11/7774* (2013.01); *F21V 5/04* (2013.01)

(58) Field of Classification Search
None
See application file for complete search history.

(56) References Cited

U.S. PATENT DOCUMENTS

2006/0124951 A1 6/2006 Sakata et al.
2007/0034887 A1 2/2007 Pang et al.
2015/0048401 A1 2/2015 Iba et al.

FOREIGN PATENT DOCUMENTS

JP 2008-231218 10/2008
JP 2012-074273 4/2012
(Continued)

OTHER PUBLICATIONS

International Search Report of PCT application No. PCT/JP2018/044330 dated Feb. 26, 2019.
(Continued)

*Primary Examiner* — Vip Patel
(74) *Attorney, Agent, or Firm* — Wenderoth, Lind & Ponack, L.L.P.

(57) ABSTRACT

A phosphor has a plate-shaped phosphor, a joining-member, and a light collecting optical member. The light collecting optical member has at least one convex surface and is fixed to the plate-shaped phosphor by the joining-member. The joining-member forms a fillet shape between a surface of the plate-shaped phosphor to which the light collecting optical member is joined and a convex surface of the light collecting optical member. In a case where a height of the fillet shape from the surface of the plate-shaped phosphor to which the light collecting optical member is joined is set as a height X and a maximum distance of the light collecting optical member from the surface of the plate-shaped phosphor to which the light collecting optical member of is joined is set as a maximum distance Y, the height X is equal to or less than ⅔ of the maximum distance Y.

15 Claims, 4 Drawing Sheets

(51) Int. Cl.
*C09K 11/77* (2006.01)
*F21V 5/04* (2006.01)

(56) References Cited

FOREIGN PATENT DOCUMENTS

WO    2004/065324    8/2004
WO    2013/146994    10/2013

OTHER PUBLICATIONS

Extended European Search Report dated Feb. 23, 2021 in corresponding European Patent Application No. 18903664.3.

PHOSPHOR AND METHOD FOR PRODUCING SAME

TECHNICAL FIELD

The present disclosure mainly relates to a phosphor, particularly a phosphor for obtaining white light by excitation using laser light having a high power density.

BACKGROUND ART

In recent years, development research for exciting a phosphor with a laser using a blue laser diode as a light emitting source to obtain white light having higher luminance than a typical light emitting diode (LED) has been actively conducted. Since such white light has low energy consumption and high luminance, it can be applied to a headlight for an automobile, a light source for an endoscope, and a high luminance projector, and large demand has been expected.

However, in a case where the output density of the laser light is increased, the amount of heat generated is increased because light energy is concentrated on a small area on the phosphor. Accordingly, temperature quenching and deterioration of the phosphor itself due to the increase in the amount of heat generated become problems. Therefore, as a phosphor responding to these laser excitation light sources, a phosphor having high heat resistance capable of maintaining a light emission amount even under irradiation with the laser light having a high output density is required.

PTL 1 discloses a phosphor in which a phosphor powder is dispersed in a silicone resin often used for an LED or the like.

In addition, as a phosphor for satisfying a required characteristic of maintaining a light emission amount under irradiation with the laser light having a high output density, for example, in PTL 2, a Melt Growth Composite (MGC) phosphor in which a light emitting material and a heat conductive material are three-dimensionally combined has been proposed. In a case where the MGC phosphor is irradiated with the laser light having a high output density, which is excitation light, fluorescence is emitted from a light emitting material constituting the MGC phosphor.

Heat generated by emitting fluorescence is transferred to the outside of the light emitting spot by the heat conductive material three-dimensionally combined with the light emitting material. As a result, temperature quenching due to the fact that temperature of the light emitting material rises too high is suppressed, and a constant light emission amount is maintained even under irradiation with the laser light having a high output density.

CITATION LIST

Patent Literature

PTL 1: Japanese Patent Unexamined Publication No. 2012-074273

PTL 2: WO2004/065324

SUMMARY

A phosphor of the present disclosure has a plate-shaped phosphor, a joining member, and a light collecting optical member.

The light collecting optical member has at least one convex surface and is fixed to the plate-shaped phosphor by the joining member.

The joining member forms a fillet shape between a surface of the plate-shaped phosphor to which the light collecting optical member is joined, and a convex surface of the light collecting optical member.

In a case where a height of the fillet shape from the surface of the plate-shaped phosphor to which the light collecting optical member is joined is set as a height X and a maximum distance of the light collecting optical member from the surface of the plate-shaped phosphor to which the light collecting optical member of is joined is set as a maximum distance Y, the height X is equal to or less than $2/3$ of the maximum distance Y.

A method for producing a phosphor of the present disclosure includes a step of mixing a raw material powder of a light emitting material and a raw material powder of a heat conductive material and putting the mixture into a melting pot, a step of heating the melting pot to melt and mix the light emitting material and the heat conductive material, a step of cooling and solidifying the melted and mixed light emitting material and the heat conductive material by pulling up or pulling down to form a Melt Growth Composite (MGC) phosphor in which the light emitting material and the heat conductive material are combined three-dimensionally, a step of processing the MGC phosphor into a plate-shaped to form a plate-shaped phosphor, a step of attaching a transparent member to the plate-shaped phosphor or a light collecting optical member, a step of bringing the light collecting optical member and the plate-shaped phosphor into contact with each other via the transparent member, and a step of joining the light collecting optical member and the plate-shaped phosphor via the transparent member.

Further, another method for producing a phosphor of the present disclosure includes a step of processing a sintered ceramic phosphor into a plate-shaped to form a plate-shaped phosphor, a step of attaching a transparent member to the plate-shaped phosphor or a light collecting optical member, a step of bringing the light collecting optical member and the plate-shaped phosphor into contact with each other via the transparent member, and a step of joining the light collecting optical member and the plate-shaped phosphor via the transparent member.

DESCRIPTION OF EMBODIMENT

In the configuration in which a phosphor powder is dispersed in a silicone resin described in PTL 1, irradiation with laser light having a high output density causes the silicone resin, which is a dispersion medium of the phosphor, to be deteriorated and discolored, and the emission luminance is reduced. In addition, in a MGC phosphor of the PTL 2, in which a light emitting material and a heat conductive material are combined three-dimensionally, the heat conductive material does not have a function of converting incident laser light into fluorescence. Therefore, particularly in a case of laser light having a high output density, a part of the incident laser light is wave-guided while reflecting the heat conductive material, and diffusely reflected and emitted outside the MGC phosphor. As a result, the fluorescence diverges from the point of incidence of the laser, and the light collection efficiency is reduced.

A phosphor of the present disclosure includes a plate-shaped phosphor and a light collecting optical member having at least one convex surface, the light collecting optical member is fixed to the plate-shaped phosphor by a joining member, the joining member forms a fillet shape between a surface of the plate-shaped phosphor to which the light collecting optical member is joined and the convex surface of the light collecting optical member, and a height X of the fillet shape from the surface of the plate-shaped phosphor to which the light collecting optical member is joined is equal to or less than ⅔ of a maximum distance Y of the light collecting optical member from the surface of the plate-shaped phosphor to which the light collecting optical member is joined.

In the phosphor of the present disclosure, the light collecting optical member has at least one convex surface, there may exist a space on at least a part of a virtual perpendicular line that is drawn from at least one point of the convex surface to the surface of the plate-shaped phosphor to which the light collecting optical member is joined.

In the phosphor of the present disclosure, the plate-shaped phosphor is a MGC phosphor, and the MGC phosphor may be formed by three-dimensionally combining a light emitting material which is a fluorescent material and a heat conductive material which is a metal oxide.

In the phosphor of the present disclosure, the phosphor has a structure in which at least one of the light emitting material or the heat conductive material is a metal oxide, and in the metal oxide of the light emitting material, a metal element may be replaced by a light emitting element.

In the phosphor of the present disclosure, the light emitting material is a light emitting material in which $Y_3Al_5O_{12}$ is used as a base material and a part of Y elements are replaced by Ce elements or a light emitting material in which $Lu_3Al_5O_{12}$ is used as a base crystal and a part of Lu atoms in the base crystal are replaced by Ce elements, and the heat conductive material may be $Al_2O_3$ or ZnO.

In the phosphor of the present disclosure, the plate-shaped phosphor may be a sintered ceramic phosphor.

In the phosphor of the present disclosure, the sintered ceramic phosphor may be a light emitting material in which $Y_3Al_5O_{12}$ is used as a base material and a part of Y elements are replaced by Ce elements.

In the phosphor of the present disclosure, the light collecting optical member may be a spherical lens made of silicon dioxide.

In the phosphor of the present disclosure, the joining member may be a thermosetting transparent member or a thermoplastic transparent member.

In the phosphor of the present disclosure, the joining member may be a silicone resin.

In the phosphor of the present disclosure, a refractive index of the joining member may be equal to or less than a refractive index of the light collecting optical member.

A method for producing a phosphor of the present disclosure includes a step of mixing a raw material powder of a light emitting material and a raw material powder of a heat conductive material and putting the mixture into a melting pot, a step of heating the melting pot to melt and mix the light emitting material and the heat conductive material, a step of cooling and solidifying the melted and mixed light emitting material and the heat conductive material by pulling up or pulling down to form a MGC phosphor in which the light emitting material and the heat conductive material are combined three-dimensionally, a step of processing the MGC phosphor into a plate-shaped to form a plate-shaped phosphor, a step of attaching a liquid monomer of a transparent member or a thermally melted transparent member to the plate-shaped phosphor or a light collecting optical member, a step of bringing the light collecting optical member and the plate-shaped phosphor into contact with each other via the transparent member, and a step of joining the light collecting optical member and the plate-shaped phosphor via the transparent member which is cooled and solidified, by curing the liquid monomer of the transparent member or by cooling and solidifying the thermally melted transparent member.

Further, another method for producing a phosphor of the present disclosure includes a step of processing a sintered ceramic phosphor into a plate-shaped to form a plate-shaped phosphor, a step of attaching a liquid monomer of a transparent member or a thermally melted transparent member to the plate-shaped phosphor or a light collecting optical member, a step of bringing the light collecting optical member and the plate-shaped phosphor into contact with each other via the transparent member, and a step of joining the light collecting optical member and the plate-shaped phosphor via the transparent member which is cooled and solidified, by curing the liquid monomer of the transparent member or by cooling and solidifying the thermally melted transparent member.

Hereinafter, the phosphor according to the exemplary embodiment and the method for producing the phosphor will be described using the accompanying drawings. In the drawings, substantially the same members are denoted by the same reference marks.

(Exemplary Embodiment)

Figure 1:
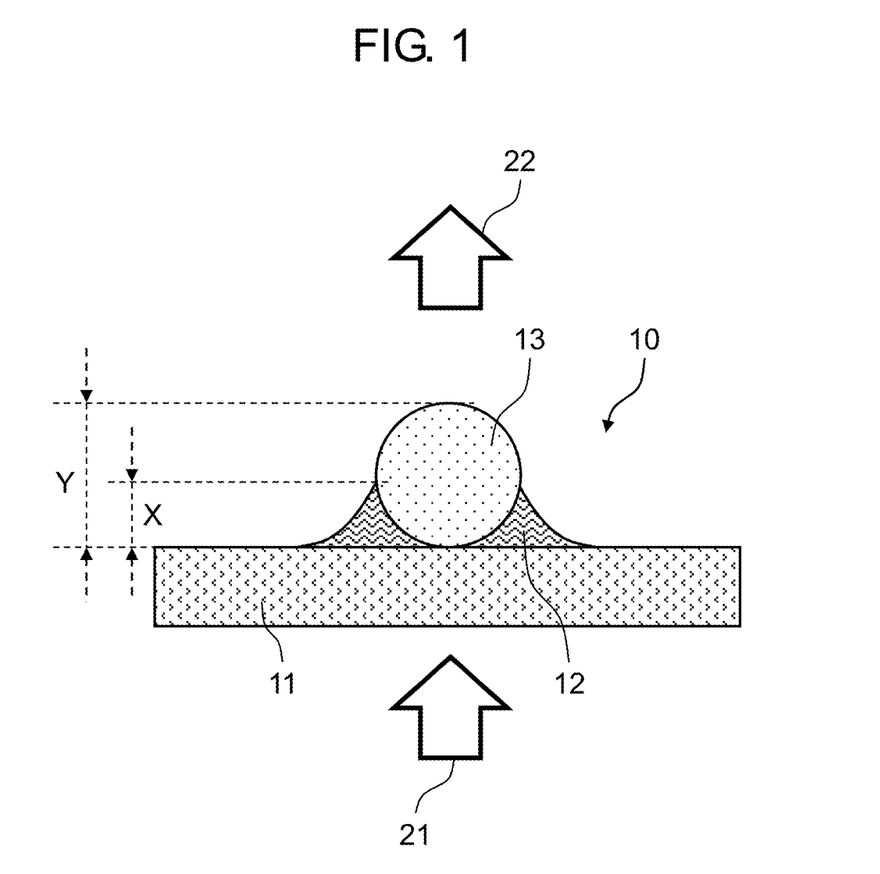
FIG. 1 is a cross-sectional view showing a cross-sectional structure of a phosphor according to an exemplary embodiment.

FIG. 1 is a cross-sectional view showing a cross-sectional structure of phosphor 10 according to an exemplary embodiment. Phosphor 10 according to the present exemplary embodiment includes plate-shaped phosphor 11 and light collecting optical member 13 having at least one convex surface. Light collecting optical member 13 is, for example, a spherical lens as shown in FIG. 1. Plate-shaped phosphor 11 and light collecting optical member 13 are adhered and fixed by joining member 12. Joining member 12 has a so-called fillet shape in which joining member 12 is adhered to both surfaces between a surface of plate-shaped phosphor 11 and a surface of light collecting optical member 13. Here, the "fillet shape" means, for example, a shape flared from the surface of light collecting optical member 13 to the surface of plate-shaped phosphor 11. In a case where laser light 21 is emitted from a surface opposite to plate-shaped phosphor 11, to which light collecting optical member 13 is joined, light emitted and scattered from plate-shaped phosphor 11 toward the surface to which plate-shaped phosphor 11 and light collecting optical member 13 are joined are collected by light collecting optical member 13. In phosphor 10, light collecting optical member 13 is fixed to a surface opposite to a surface on which the laser light is incident by joining member 12. Accordingly, a light collection effect can be enhanced. Further, according to phosphor 10, a height X of the fillet shape of joining member 12 is equal to or less than ⅔ of a maximum distance Y of light collecting optical member 13. As a result, an area in which joining member 12 covers a part of an optical path of the light emitted from light collecting optical member 13 is limited, and a decrease in the light emission intensity can be suppressed.

Hereinafter, members constituting the phosphor will be described.

(Plate-Shaped Phosphor)

Plate-shaped phosphor 11 may be a plate-shaped phosphor in which a phosphor material emits light of a longer wavelength in a case where light of a specific wavelength is incident. For example, a plate-shaped phosphor in which a Melt Growth Composite (MGC) phosphor (see FIG. 2B) in which light emitting material 15 and heat conductive material 14 to be described later are combined three-dimensionally is processed into a plate-shaped or a plate-shaped phosphor in which a sintered ceramic phosphor produced by sintering a light emitting material powder is processed into the plate-shaped can be used. In phosphor 10 of the present exemplary embodiment, laser light 21 is emitted from the backside of the surface to which light collecting optical member 13 is joined, and fluorescence generated by plate-shaped phosphor 11 is collected by light collecting optical member 13 and defined as fluorescence 22. From the viewpoint of enhancing the light collection effect of the fluorescence on the surface to which light collecting optical member 13 is joined, a thickness of plate-shaped phosphor 11 is preferably 50 μm or more and 2,000 μm or less. In a case where the thickness is less than 50 μm, the strength of plate-shaped phosphor 11 is reduced, and plate-shaped phosphor 11 is easily damaged in production process. In a case where the thickness is more than 2,000 μm, the fluorescence generated by the incidence of laser light 21 is absorbed by plate-shaped phosphor 11 itself, and thus the light emission intensity of fluorescence 22 on a direction opposite to the incident direction of laser light 21 decreases, which is not preferable. From the viewpoint of achieving both easy handling in the production process of the present exemplary embodiment and the light emission intensity, the thickness of plate-shaped phosphor 11 is more preferably 100 μm or more and 1 mm or less.

(Light Emitting Material)

Examples of the light emitting material include an oxide, a nitride, and a sulfide, and the like, in which a metal element is activated as a light emitting ion in a base crystal. An inorganic light emitting material in which one or more atoms of B, Gd, O, S, Al, Ga, Ba, Sr, K, V, La, Cl, P, In, Zn, Y, Lu, Ca, Mg, and the like are used as the composition of the base crystal and one or more of Zn, Ho, Tb, Nd, Ag, Mn, Ce, Eu, Dy, Tm, and the like are activated and used as a light emitting central atom can be used as the light emitting material.

Among these, a light emitting material can be preferably selected from the viewpoint that, in a case of producing a MGC phosphor, the light emitting material is easily melted in a melting pot in the production process and is easily eutectic with $Al_2O_3$ which can be suitably used as a heat conductive material to be described later. For example, a light emitting material (hereinafter, also referred to as Ce:YAG) in which $Y_3Al_5O_{12}$ is used as the base crystal and a part of Y atoms in the base crystal are replaced by Ce atoms can be preferably used. In addition, a light emitting material (hereinafter, also referred to as Ce:LuAG) in which $Lu_3Al_5O_{12}$ is used as the base crystal and a part of Lu atoms in the base crystal are replaced by Ce atoms can be preferably used.

In addition, in a case of forming the sintered ceramic phosphor, a Ce:YAG phosphor can be preferably used from the viewpoint of high light emission efficiency.

(Heat Conductive Material)

As the heat conductive material in a case of producing the MGC phosphor, ceramic materials such as a metal oxide, a metal nitride, and a metal carbide can be used. Examples of the metal oxide include $Al_2O_3$, $MgO$, $ZrO_2$, $TiO_2$, $SiO_2$, $CaO$, $Y_2O_3$, $ZnO$, a rare earth oxide, and the like. Among these, $Al_2O_3$ is preferable from the viewpoint that transparency is high and it is easy to be eutectic with the above-described Ce:YAG phosphor and Ce:LuAG phosphor. On the other hand, ZnO is preferable from the viewpoint that a refractive index is low and scattering due to the waveguiding of the incident laser light is easily controlled.

In addition, in a case where the plate-shaped phosphor is the above-described sintered ceramic phosphor, a sintered ceramic phosphor in which the light emitting material and the heat conductive material are physically mixed and which has a high heat dissipation effect can also be obtained by mixing a light emitting material powder and the heat conductive material powder together and sintering the mixture. In this case, as the heat conductive material to be used, the same material as the heat conductive material in the above-described MGC phosphor can be used.

(Joining Member)

As joining member 12, a transparent thermoplastic resin or a resin forming a transparent polymer by polymerizing a monomer, for example, such a thermosetting resin, a photocurable resin, or a moisture-curable resin can be used. The plate-shaped phosphor and the light collecting optical member are disposed so that both the plate-shaped phosphor and the light collecting optical member come in contact with a liquid-form joining member before curing or in a thermally melted state, and then the plate-shaped phosphor and the light collecting optical member are joined by curing or cooling and solidifying. Further, in a case where the plate-shaped phosphor is irradiated with laser light having a high output density, it is assumed that the temperature of the plate-shaped phosphor becomes 100° C. or higher. Accordingly, a transparent resin having a softening point higher than 100° C. and high heat resistance can be used as joining member 12.

As joining member 12, polyvinyl alcohol, polystyrene, a styrene-acrylonitrile copolymer, a styrene-butadiene-acrylonitrile copolymer, polyethylene, an ethylene-vinyl acetate copolymer, polypropylene, polymethyl methacrylate, a methacryl styrene polymer, cellulose acetate, polycarbonate, polyester, polyethylene terephthalate (PET), vinylidene trifluoride, an epoxy resin, a silicone resin, polyether sulfone, cycloolefin, triacetate, an organic-inorganic hybrid resin, and the like can be used alone, and two or more thereof can be used in combination. Among these, a silicone resin, an organic-inorganic hybrid resin, and a hybrid glass can be suitably used from the viewpoint of high heat resistance. Among these, a hybrid glass having a continuous heat resistance temperature of 200° C. or higher can be particularly suitably used. The hybrid glass is a kind of silicone resins having a siloxane skeleton as a main skeleton, and from this viewpoint, it can be also said that the hybrid glass is a highly heat-resistant silicone resin. Further, the hybrid glass has a feature that the continuous heat resistance temperature is 200° C., and the reduction of the transmittance of the hybrid glass is 1% or less even in a case of being left at 200° C. for 1,000 hours.

In addition, in a case where the fluorescence emitted from plate-shaped phosphor 11 is incident on light collecting optical member 13 to described below, it is preferable that the refractive index of joining member 12 is equal to or less than a refractive index of light collecting optical member 13 to described later from the viewpoint of suppressing the reflection at the interface between joining member 12 and light collecting optical member 13. That is, it is preferable that n1≥n2, in a case where n1 is set as the refractive index of light collecting optical member 13 to be described below at a wavelength of 550 nm and n2 is set as the refractive index of the joining member at a wavelength of 550 nm.

Although a supply amount of the joining member before curing or before cooling and solidifying is not limited, the supply amount can be defined based on a fillet formed between plate-shaped phosphor 11 and light collecting optical member 13. That is, regarding X/Y which is a ratio of a height X of the fillet shown as a mark X in FIG. 1 from the surface of plate-shaped phosphor 11 on which light collecting optical member 13 is mounted and a maximum distance Y of light collecting optical member 13 shown as a mark Y in FIG. 1, 0<X/Y≤2/3 can be defined. Because at least the fillet shape by joining member 12 may be formed between light collecting optical member 13 and plate-shaped phosphor 11, the lower limit of X/Y may be more than zero. In a case where X/Y is more than 2/3, there is a high possibility that joining member 12 obstructs a part of the optical path of the light emitted from light collecting optical member 13, which leads to a decrease in light emission intensity.

Figure 3:
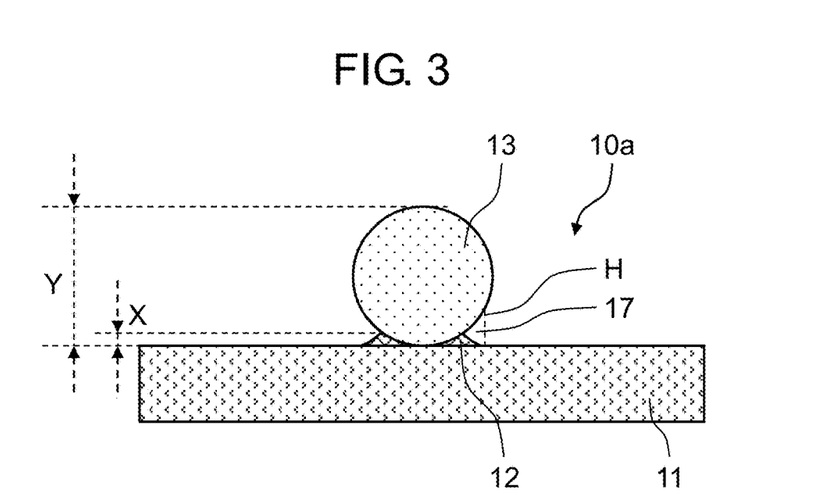
FIG. 3 is a cross-sectional view of a phosphor according to Example 16.

In a case shown in FIG. 3, X/Y is, for example, 1/10. In this case, at least one convex surface of light collecting optical member 13 faces plate-shaped phosphor 11. In FIG. 3, there exists space 17 between plate-shaped phosphor 11 and the convex surface of light collecting optical member 13, facing plate-shaped phosphor 11. That is, there exists a space, that is, air on at least a part of a virtual perpendicular line that is drawn from at least one point of the convex surface of light collecting optical member 13, which faces plate-shaped phosphor 11, to the surface of plate-shaped phosphor 11, to which light collecting optical member 13 is joined. An example of an imaginary perpendicular line is shown as a mark H in FIG. 3. In this case, a part of the light emitted from plate-shaped phosphor 11 passes through space 17 and is incident on light collecting optical member 13. In a case where space 17 is, for example, air, a refractive index thereof is 1, which is smaller than a refractive index of joining member 12. Therefore, the light emitted from space 17 to light collecting optical member 13 is efficiently collected and a higher light collection effect is obtained in comparison with a case where space 17 does not exist.

Figure 5:
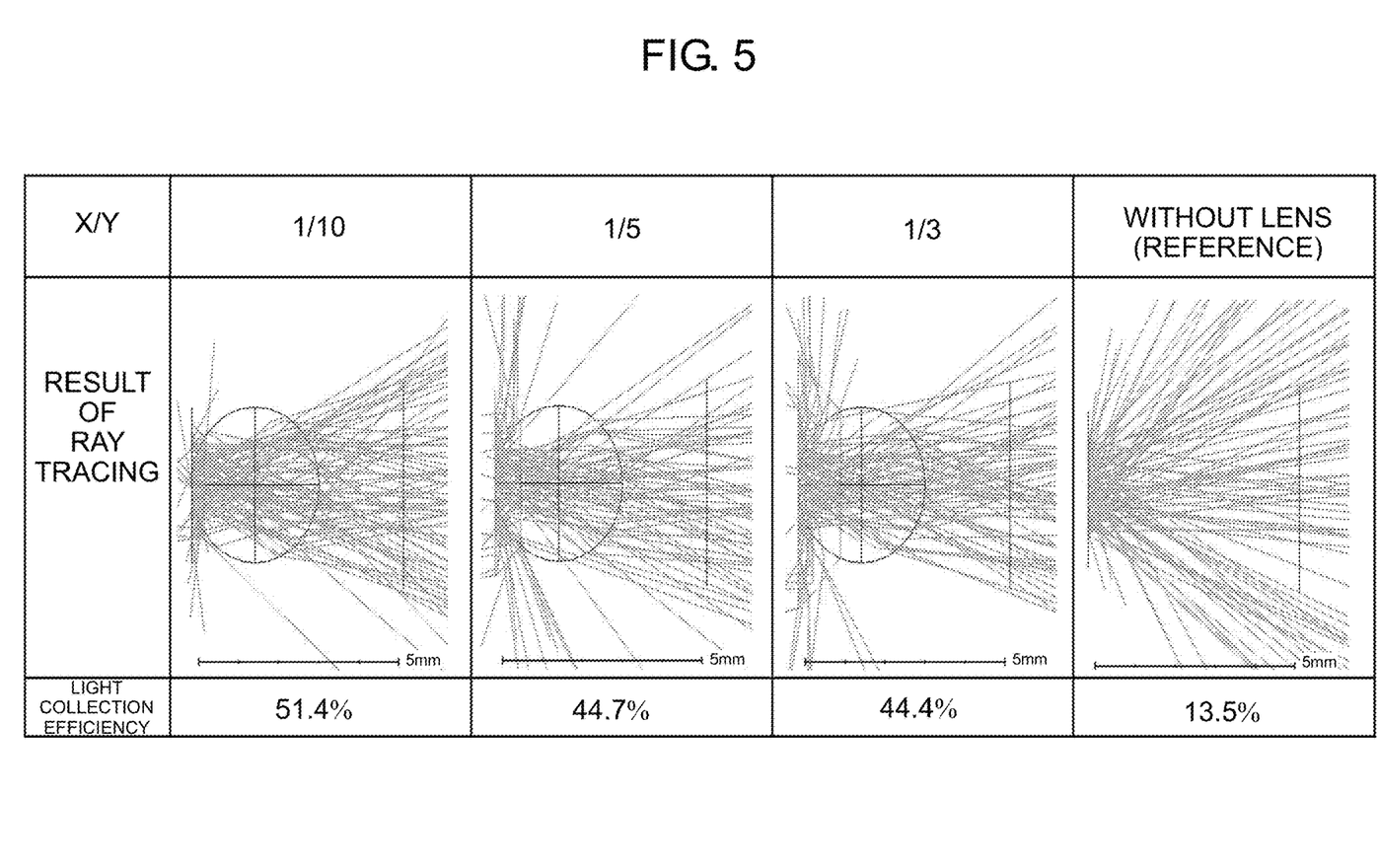
FIG. 5 is a diagram showing a result of an optical simulation of the phosphor according to the exemplary embodiment.

FIG. 5 and Tables 1 to 3 show the results of optical simulations in which the light collection efficiency was calculated with respect to the values of X/Y. Simulations were performed using a ray tracing software. The light collecting optical member was set as a sphere having a diameter of 3 mm and a refractive index of 1.52, the refractive index of the joining member was set to 1.43, and an angle formed by the fillet of the joining member and the plate-shaped phosphor was set to 45°. In addition, it was assumed that plate-shaped phosphor 11 is irradiated with laser for excitation from the side opposite to the light collecting optical member, and fluorescent light having a wavelength of 550 nm is emitted as a Lambertian light with a diameter of 1.5 mm from the joining surface of the light collecting optical member and passes through the joining member and the light collecting optical member. Under the conditions described above, the proportion of the light collected within a diameter of 4 mmφ at a position located at a distance of 5 mm from the joining surface of the light collecting optical member in the plate-shaped phosphor was set as the light collection efficiency in this simulation, and the simulation was performed. As shown in FIG. 5, it can be seen that the light collection efficiency increases as X/Y decreases, and the light collection efficiency increases to 51.4%, exceeding 50%, in a case where X/Y decreases to 1/10. From the above simulation results, as shown in FIG. 3, it can be seen that a part of the light emitted from plate-shaped phosphor 11 passes through space 17 and is incident on light collecting optical member 13, and thus the light incident on light collecting optical member 13 from space 17 is efficiently collected in comparison with a case where space 17 does not exist and a higher light collection effect is obtained. In particular, in a case where X/Y is less than 1/10, it can be said that the light collection efficiency is high, exceeding 50%.

(Light Collecting Optical Member)

As light collecting optical member 13, a transparent member having at least one part of a convex surface, such as a plano-convex lens, a double convex lens, or a spherical lens, can be selected. Furthermore, the curved surface is not limited to a spherical shape, a non-spherical shape or the like, but from the viewpoint of further enhancing the light collection effect, it is possible to suitably use a curved surface which can have a convex surface in both the direction facing plate-shaped phosphor 11 and the light emission direction when viewed from light collecting optical member 13, such as a double convex lens or a spherical lens. An aspheric lens can also be used as long as light collecting optical member 13 has a convex surface.

A material of light collecting optical member 13 is not limited and may be a transparent member. From the viewpoint that fluorescent light emitted from a light emitting member is easily transmitted and attenuation of light emission is suppressed, the transmittance of light in visible wavelength range may be 80% or more. In a case of light collecting optical member 13 mainly formed of silicon dioxide, specifically, Pyrex (registered trade name), BK7, a synthetic quartz, an anhydrous synthetic quartz, a soda-lime glass, a crystallized glass, or the like may be used. In addition, by combining a glass in which wavelength dispersion of the refractive index is small and a glass in which wavelength dispersion of the refractive index is large as light collecting optical member 13, an achromatic lens in which chromatic aberration is corrected can be obtained. In addition, in a case of light collecting optical member 13 mainly formed of a resin material, a transparent resin material can be used.

In addition, as light collecting optical member 13, for example, an acrylic resin such as polymethyl methacrylate, a styrene resin, a polyolefin resin or polycarbonate, a silicone resin or a resin obtained by combining thereof, or as the same resin as in the joining member, polyvinyl alcohol, polystyrene, a styrene-acrylonitrile copolymer, a styrene-butadiene-acrylonitrile copolymer, polyethylene, an ethylene-vinyl acetate copolymer, polypropylene, polymethyl methacrylate, a methacryl styrene polymer, cellulose acetate, polycarbonate, polyester, PET, vinylidene trifluoride, an epoxy resin, a silicone resin, polyether sulfone, cycloolefin, triacetate, an organic-inorganic hybrid resin, and the like can be used. As a transparent material constituting light collecting optical member 13 other than the above-described materials, sapphire, $CaF_2$, diamond, or the like can also be used.

The joining direction of light collecting optical member 13 to plate-shaped phosphor 11 is not limited, and the joining may be performed in any direction as long as the light emitted from plate-shaped phosphor 11 can be collected.

The size of light collecting optical member 13 is not limited, but the diameter of light collecting optical member 13 is preferably ½ or more of the irradiation diameter of the laser light emitted to plate-shaped phosphor 11 and 5 times or less the irradiation diameter of the laser light, which depends on the size and shape of plate-shaped phosphor 11. In a case where the irradiation diameter of the laser light is less than ½, the amount of light which is incident on light collecting optical member 13 and which is generated by excitation with the laser light, is small, and the light cannot be sufficiently collected. In addition, in a case where the irradiation diameter of the laser light is more than 5 times the irradiation diameter of the laser light, the radius of curvature (hereinafter, referred to as R) becomes large, and the light emission generated by the excitation with the irradiation with laser light cannot be sufficiently collected.

(Method for Producing Phosphor)

A method for producing phosphor 10 of the present exemplary embodiment will be described using FIGS. 4A to 4E.

Figure 4A:
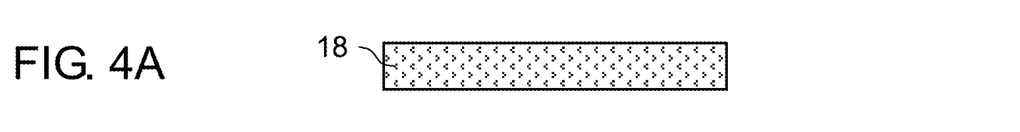
FIG. 4A is a schematic cross-sectional view showing a part of the production process of Example 1.

(1) First, MGC phosphor 18 is prepared as a plate-shaped phosphor (FIG. 4A).

The MGC phosphor can be produced by the following method.

(1-a) For example, each of powders which are raw materials of light emitting material 15 and heat conductive material 14 is mixed in a melting pot. A Yttrium oxide ($Y_2O_3$) powder and a cerium oxide ($CeO_2$) powder can be selected as the raw material of light emitting material 15, and an aluminum oxide ($Al_2O_3$) powder can be selected as the raw material of the heat conductive material.

(1-b) These powders are mixed at a predetermined ratio, and melted and mixed by heating the melting pot to a temperature which is equal to or more than the melting point of the raw materials, for example, about 1,900° C. As a heating method, induction heating or resistance heating can be suitably used from the viewpoint that the temperature can be easily controlled, a melting pot portion can be locally heated, and the molten liquid can be drawn out while cooling by a method such as pulling up or pulling down.

(1-c) In a case of using a melting pot having beforehand a hole at the bottom, a rod-shaped MGC phosphor is obtained by fusion welding a crystal that becomes a seed crystal to the molten liquid that has exuded from the hole at the bottom and by cooling while pulling down at a constant speed. In a case of the above-described composition, light emitting material 15 is Ce:YAG, heat conductive material 14 is $Al_2O_3$, and an MGC phosphor in which these materials are three-dimensionally combined can be obtained. Alternatively, a rod-shaped MGC phosphor may be produced from a melting pot having no hole at the bottom by a unidirectional solidification by a so-called pulling up method from a molten liquid surface.

(1-d) By cutting and polishing the rod-shaped MGC phosphor, a plate-shaped MGC phosphor 18 having a desired thickness can be obtained.

Figure 4B:
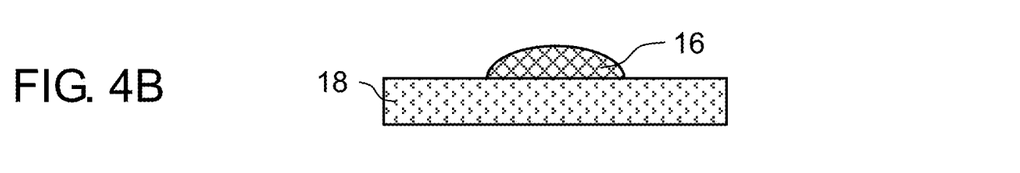
FIG. 4B is a schematic cross-sectional view showing a part of the production process of Example 1.
Figure 4C:
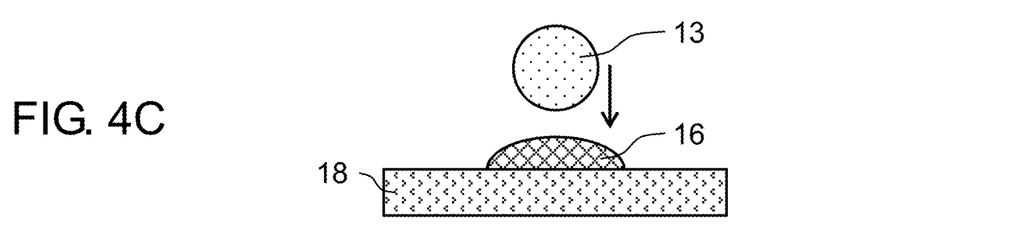
FIG. 4C is a schematic cross-sectional view showing a part of the production process of Example 1.
Figure 4D:
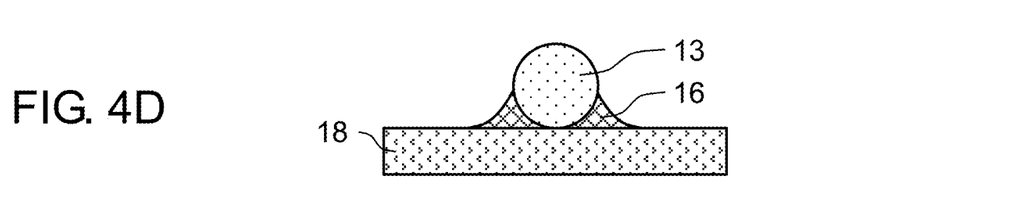
FIG. 4D is a schematic cross-sectional view showing a part of the production process of Example 1.

(2) Next, light collecting optical member 13 is joined to MGC phosphor 18 using joining member 12. Light collecting optical member 13 is prepared, and in a case where joining member 12 is a thermosetting resin or a photocuring resin, monomer liquid 16 thereof is attached to light collecting optical member 13 (FIG. 4B). Then, light collecting optical member 13 is set on the plate-shaped MGC phosphor 18 so that applied monomer liquid 16 also comes in contact with the plate-shaped MGC phosphor 18 (FIGS. 4C and 4D).

Figure 4E:
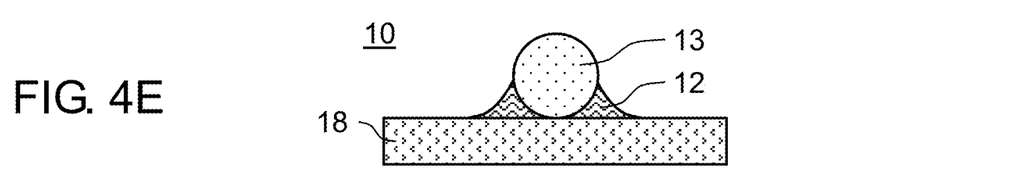
FIG. 4E is a schematic cross-sectional view showing a part of the production process of Example 1.

(3) Further, the monomer liquid is cured by a curing method according to a curing method of monomer liquid 16 such as irradiation with light or heating, and the plate-shaped MGC phosphor 18 and light collecting optical member 13 are joined and fixed (FIG. 4E). In this way, the phosphor of the present exemplary embodiment can be obtained.

In addition, in a case where joining member 12 is a thermoplastic resin, the thermoplastic resin is heated to a temperature equal to or higher than the softening point, and a liquified resin is attached to light collecting optical member 13. Thereafter, before the applied thermoplastic resin is cooled and solidified, light collecting optical member 13 is set on MGC phosphor 18 so as to come in contact with MGC phosphor 18, and phosphor 10 according to the present exemplary embodiment can be obtained by attachment by cooling and solidifying. Even in a case where joining member 12 is a curable resin or a thermoplastic resin, it is preferable that joining member 12 is not applied in the light emission direction of light collecting optical member 13.

Further, in a case of joining light collecting optical member 13 and MGC phosphor 18, the joining member is first attached to MGC phosphor 18 as a liquid droplet, then light collecting optical member 13 is set on the joining member before curing or before cooling and solidifying, and the phosphor can also be obtained by curing, or cooling and solidifying.

The method for attaching joining member 12 as the liquid droplet to MGC phosphor 18 is preferred in terms of production from the viewpoint that joining member 12 is difficult to be attached in the light emission direction of light collecting optical member 13.

EXAMPLE

Hereinafter, Examples and Comparative Examples will be specifically described.

Figure 2A:
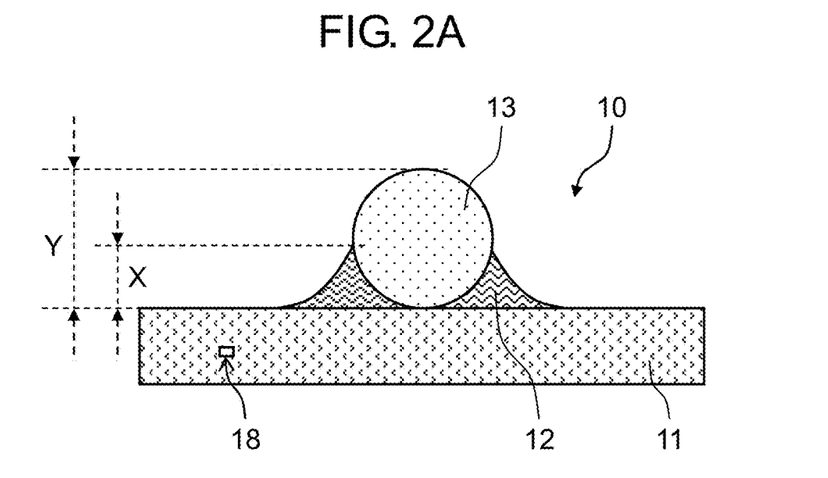
FIG. 2A is a cross-sectional view showing a cross-sectional structure of the phosphor according to the exemplary embodiment.
Figure 2B:
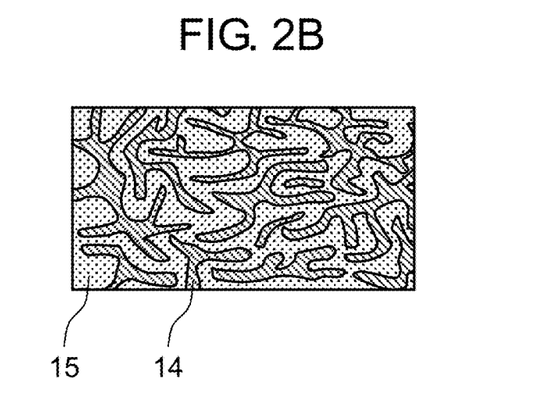
FIG. 2B is an enlarged schematic cross-sectional view showing a microstructure of a MGC phosphor in FIG. 2A.

In Example 1, as shown in FIG. 2A, plate-shaped phosphor 11 is MGC phosphor 18, and as shown in FIG. 2B, heat conductive material 14 and light emitting material 15 are three-dimensionally combined as a microstructure thereof. Further, Ce:YAG is used as light emitting material 15 in the MGC phosphor, $Al_2O_3$ is used as heat conductive material 14, a silicone resin containing dimethyl silicone as a main component is used as joining member 12, and a spherical lens is used as light collecting optical member 13.

(1) First, plate-shaped phosphor 11 is prepared. Hereinafter, a method for producing a plate-shaped phosphor formed of the MGC phosphor will be described.

(1-a) A predetermined amount of powder of a predetermined amount of yttrium oxide ($Y_2O_3$), cerium oxide ($CeO_2$), and aluminum oxide ($Al_2O_3$) is added into an iridium melting pot. A protrusion of 5 mm square and 2 mm height is provided at the bottom of the melting pot, and a through-hole with a diameter of 1 mmφ is further provided at the center of the bottom of the protrusion of 5 mm square. The inner diameter of the melting pot is 20 mm, and the height of the inner wall is 30 mm.

(1-b) Next, the melting pot is set in a cylindrical heat insulating material container, and a heat insulating material is set in a cylindrical quartz tube. Further, the quartz tube is set inside a coil for the induction heating. A lid having an outlet of nitrogen gas and a lid having an inlet of nitrogen gas are respectively provided above and below the quartz tube.

(1-c) While nitrogen gas flows the inside of the quartz tube, the inside of the quartz tube is filled with nitrogen to form an oxidation-suppressed atmosphere. In this state, an alternating current is applied to the coil to induction heating the inside of the quartz tube. Since a peephole is provided in the heat insulating material, and the temperature of the side surface of the melting pot can be measured by a known method, for example, using a radiation thermometer through the gap within the coil, the peephole, and the quartz tube.

(1-d) After confirming that the temperature of the side surface of the melting pot has been heated to about 1,900° C. and a molten liquid has exuded from the hole at the bottom of the melting pot, a crystal of $Al_2O_3$ of 5 mm square is brought into contact with the exuded liquid, and pulled down by using surface tension at a constant speed of, for example, 3 mm/sec. Due to the interfacial tension, the molten liquid inside the melting pot is sequentially drawn from the hole. The drawn molten liquid soaks and spreads at the bottom of the melting pot, is pulled down while maintaining the cross-sectional shape of the protrusion at the bottom of the melting pot, and is solidified by cooling while being pulled down as the distance from the protrusion at the bottom of the melting pot increases, and a rod-shaped MGC phosphor can be obtained.

(1-e) The cross-sectional shape in the direction perpendicular to the pulling-down direction of a rod has the same size and shape as the cross-section of the protrusion of the bottom of the melting pot described above, and is 5 mm square. The obtained rod-shaped MGC phosphor can be made into a plate-shaped MGC phosphor having a desired thickness by processing such as cutting and polishing. In the present example, the thickness is set to 100 μm. That is, the plate-shaped phosphor in the present example is a plate-shaped MGC phosphor having a size of 5 mm square and a thickness of 100 μm, a light emitting material is Ce:YAG, and a heat conductive material is $Al_2O_3$.

(2) Next, a light collecting optical member and a joining member are prepared, and the light collecting optical member is joined to the above-described plate-shaped phosphor using the joining member. In the present example, the light collecting optical member is a spherical lens, a material of the spherical lens is BK7, and the diameter of the spherical lens is 3 mm. As the joining member, a silicone resin having a thermosetting dimethyl silicone skeleton was used.

(2-a) As shown in FIG. 4A, first, plate-shaped phosphor 11 is left to stand so that a plane of 5 mm square is horizontal, and monomer liquid 16 of a thermosetting silicone resin is attached as a liquid droplet having a diameter of 2 mm substantially at the center of the plane (FIG. 4B).

(2-b) Next, as shown in FIG. 4C, light collecting optical member 13 (spherical lens) which is a light collecting optical member is positioned substantially at the center of the liquid droplet of monomer liquid 16 as shown by an arrow in the figure.

(2-c) As shown in FIG. 4D, monomer liquid 16 of the thermosetting silicone resin is pushed aside by light collecting optical member 13. In addition, monomer liquid 16 becomes a fillet-shaped form in which monomer liquid 16 simultaneously soaks and spreads to the bottom of light collecting optical member 13 which is a light collecting optical member and plate-shaped phosphor 11 due to surface tension.

(3) Further, by heating at 150° C. which is the curing temperature of the used thermosetting silicone resin for 4 hours to cure the silicone resin, the plate-shaped phosphor and the spherical lens are joined and fixed, and phosphor 10 of Example 1 is obtained (FIG. 4E). In the above-described process, a silicone resin which is a joining member, that is, a fillet of joining member 12 is formed between the plate-shaped phosphor and the spherical lens as shown in FIG. 4E. In the present example, a height X of the fillet is ⅓ of a maximum distance Y of the spherical lens. The refractive index of the silicone resin at a wavelength of 550 nm is 1.43, and the refractive index of BK7 at a wavelength of 550 nm is 1.52.

Example 2 is the same as Example 1 except that the diameter of the spherical lens which is the light collecting optical member is 1 mm.

Example 3 is the same as Example 1 except that the diameter of the spherical lens which is the light collecting optical member is 5 mm.

Example 4 is the same as Example 1 except that the height of the fillet is ⅔ of the height of the light collecting optical member.

Example 5 is the same as Example 1 except that a material of the light collecting optical member is a synthetic quartz. The refractive index of the synthetic quartz forming the light collecting optical member in the present exemplary embodiment is 1.46.

Example 6 is the same as Example 1 except that a material of the light collecting optical member is polymethyl methacrylate. The refractive index of polymethyl methacrylate forming the light collecting optical member in the present exemplary embodiment is 1.67.

Example 7 is the same as Example 1 except that a material of the light collecting optical member is polymethyl methacrylate and the joining member is a transparent epoxy resin. The refractive index of polymethyl methacrylate forming the light collecting optical member in the present exemplary embodiment is 1.67, and the refractive index of the epoxy resin forming the joining member is 1.575.

Example 8 is the same as Example 1 except that the plate-shaped phosphor is a sintered body of Ce:YAG. In the present example, the plate-shaped phosphor was produced as follows. Yttrium oxide, aluminum oxide, and cerium oxide were each weighed to a specified amount, and isopropanol was added to make a liquid mixture. This liquid mixture was stirred and mixed by a bead mill to form a slurry. Next, this slurry was molded into a shape of a 5 mm square and a thickness of 100 μm by a slurry cast molding method (slip casting). This molded product was baked at 1,200° C. for 2 hours to be sintered, thereby producing a plate-shaped phosphor which was a sintered body of Ce:YAG.

Example 9 is the same as Example 1 except that the plate-shaped phosphor is an MGC phosphor and a light emitting material in the MGC phosphor is Ce:LuAG.

Example 10 is the same as Example 1 except that the plate-shaped phosphor is the MGC phosphor and the heat conductive material thereof is zinc oxide.

Example 11 is the same as Example 1 except that the light collecting optical member is a double convex lens. In the double convex lens of the present example, R of both convex surfaces is 5.88 mm, the diameter is 3 mm, and the central thickness is 1.8 mm.

Example 12 is the same as Example 1 except that the joining member is a polyethylene resin which is a thermoplastic resin and the refractive index thereof is 1.49. At the time of production, the polyethylene resin was heated to 150° C., thermally melted and then applied in the form of a liquid droplet to the plate-shaped phosphor, a spherical lens with a diameter of 3 mm, which is the light collecting optical member, was joined and cooled, and the phosphor of the present exemplary embodiment was obtained.

Example 13 is the same as Example 1 except that the thickness of the plate-shaped phosphor is 50 μm.

Example 14 is the same as Example 1 except that the thickness of the plate-shaped phosphor is 2,000 μm.

Example 15 is the same as Example 1 except that the joining member is a highly heat-resistant silicone resin having a continuous heat resistance temperature of 200° C.

Example 16 is the same as Example 1 except that the height of the fillet is 1/10 of the height of the light collecting optical member, as shown in FIG. 3. In addition, the evaluation to be described later was performed in a state where air was filled in space 17 of FIG. 3.

Example 17 is the same as Example 1 except that the light collecting optical member is an aspherical double convex lens. The aspherical double convex lens used has a small aberration in comparison with a spherical double convex lens, an outer diameter of 3 mm, and a focal length of 6 mm.

Comparative Example 1 is the same as Example 1 except that the light collecting optical member and the joining member were not combined.

Comparative Example 2 is the same as Example 4 except that polyvinyl chloride having a low continuous heat resistance temperature of 79° C. was used as the joining member.

Comparative Example 3 is the same as Example 1 except that the height of the fillet is 3/4 of the height of the light collecting optical member.

With respect to the above Examples and Comparative Examples, in a case where the excitation laser was collected on the surface opposite to the surface to which the light collecting optical member was joined, the light collection effect, the light emission intensity, and the heat resistance in plate-shaped phosphor 11 were evaluated. Laser light of a blue laser having a wavelength of 450 nm was collected to a diameter of 1 mm by a lens and adjusted so that the laser light of an energy density of 50 W/mm² was applied to the position in which the light collecting optical member was joined in the surface opposite to the surface to which the light collecting optical member was joined.

The determination criteria for each evaluation item are described below.

(Light Collection Effect)

The phosphors of Examples and Comparative Examples were compared with each other with respect to light emission from the surface opposite to the surface on which the blue laser was incident, that is, the surface to which the light collecting optical member was joined. A white paper was vertically placed at a position 20 mm away from the surface of the plate-shaped phosphor to which the light collecting optical member was joined. With respect to the diameter of the light emitted to the white paper (hereinafter, referred to as light emission diameter), a relative value (hereinafter, referred to as light emission diameter relative value) in a case where the light emission diameter of Comparative Example 1 was set to 1 was measured, and the determination was performed as described below.

<Determination Criteria>

As a range in which the light collection effect was particularly excellent, a range in which the light emission diameter relative value was −0.3 or less was defined as "A". As a range in which the light collection effect was excellent, a range in which the light emission diameter relative value was more than −0.3 and −0.1 or less was defined as "B". As a range in which the light collection effect was insufficient, a range in which the light emission diameter relative value was more than −0.1 was defined as "C".

(Light Emission Intensity)

In order to measure the light emission intensity of the phosphors of Examples and Comparative Examples, the light output of the fluorescence component from the side of the plate-shaped phosphor on which the light collecting optical member was provided was measured. That is, the laser was incident from the side opposite to the light collecting optical member, the light emitted from the light collecting optical member was collimated by a lens, and further collected on a light output detector by the lens. The output density of the laser light to be emitted was adjusted to 1.5 W/mm², and the light output of the fluorescence component was measured within a range not exceeding the upper limit of detection of the light output detector. A blue light cutoff filter was installed in front of the light output detector to measure the output of only the fluorescence so that the blue laser that passed through the MGC phosphor was not incident on the light output detector and only the light of the fluorescence component could be measured.

<Determination Criteria>

As a range particularly suitable for application to an optical product, a range in which fluorescence output was 40 mW or more was defined as "A". As a range suitable for application to an optical product, a range in which fluorescence output was less than 40 mW and 30 mW or more was defined as "B". As a range not suitable for application to an optical product, a range in which fluorescence output was less than 30 mW was defined as "C".

(Heat Resistance)

From the viewpoint of evaluating the heat resistance against the temperature rise by the excitation laser, each phosphor of Examples and Comparative Examples was left in a dryer at 100° C. for 1,000 hours, and a ratio Ia/Ib, which is the ratio of the light emission intensity Ia after being left with respect to the light emission intensity Ib before being left, was evaluated. In a case of a phosphor having poor heat resistance, the light emitted from the plate-shaped phosphor is absorbed mainly due to discoloration of the joining material, and the light emission intensity is reduced.

<Determination Criteria>

As a range in which the heat resistance was particularly excellent, a range in which Ia/Ib was 0.93 or more was defined as "A". As a range in which the heat resistance was excellent, a range in which Ia/Ib was less than 0.93 and 0.90 or more was defined as "B". As a range in which the heat resistance was inferior, a range in which Ia/Ib was less than 0.90 was defined as "C".

(Overall Determination)

For each of Examples and Comparative Examples, the overall determination was defined as follows. In a case where all of the light collection effect, light emission intensity, and heat resistance were "A", the overall determination was defined as "A". In a case where at least one of the light collection effect, light emission intensity, or heat resistance was "C", the overall determination was defined as "C". In any case except for the above two cases, the overall determination was defined as "B".

TABLE 1

| | | | Example 1 | Example 2 | Example 3 | Example 4 | Example 5 | Example 6 | Example 7 |
|---|---|---|---|---|---|---|---|---|---|
| Plate-shaped phosphor | MGC | Light emitting material | Ce:YAG | Ce:YAG | Ce:YAG | Ce:YAG | Ce:YAG | Ce:YAG | Ce:YAG |
| | | Heat conductive material | Al2O3 | Al2O3 | Al2O3 | Al2O3 | Al2O3 | Al2O3 | Al2O3 |
| | | Sintered ceramic phosphor | — | — | — | — | — | — | — |
| | | Thickness/μm | 100 | 100 | 100 | 100 | 100 | 100 | 100 |
| Joining member | Resin type | | Thermosetting | Thermosetting | Thermosetting | Thermosetting | Thermosetting | Thermosetting | Thermosetting |
| | Material | | Silicone resin | Silicone resin | Silicone resin | Silicone resin | Silicone resin | Silicone resin | Epoxy resin |
| | Continuous heat resistance temperature/° C. | | 170 | 170 | 170 | 170 | 170 | 170 | 145 |
| | Refractive index (550 nm) | | 1.43 | 1.43 | 1.43 | 1.43 | 1.43 | 1.43 | 1.575 |
| | X/Y | | 1/3 | 1/3 | 1/3 | 2/3 | 1/3 | 1/3 | 1/3 |
| Light collecting optical member | Shape | | Spherical lens | Spherical lens | Spherical lens | Spherical lens | Spherical lens | Spherical lens | Spherical lens |
| | Material | | BK7 | BK7 | BK7 | BK7 | Synthetic quartz | Polymethyl methacrylate | Polymethyl methacrylate |
| | Diameter/mm | | 3 | 1 | 5 | 3 | 3 | 3 | 3 |
| | Refractive index (550 nm) | | 1.52 | 1.52 | 1.52 | 1.52 | 1.46 | 1.67 | 1.67 |
| Light collection effect | Light emission diameter relative value | | −0.31 | −0.15 | −0.25 | −0.32 | −0.13 | −0.33 | −0.13 |
| | Determination | | A | B | B | A | B | A | B |
| Light emission intensity | Fluorescence output/mW | | 40 | 32 | 38 | 34 | 40 | 33 | 30 |
| | Determination | | A | B | B | B | A | B | B |
| Heat resistance | Ia/Ib | | 0.93 | 0.93 | 0.92 | 0.92 | 0.93 | 0.90 | 0.90 |
| | Determination | | A | A | B | B | A | B | B |
| Overall determination | | | A | B | B | B | B | B | B |

TABLE 2

| | | | Example 8 | Example 9 | Example 10 | Example 11 | Example 12 | Example 13 | Example 14 |
|---|---|---|---|---|---|---|---|---|---|
| Plate-shaped phosphor | MGC | Light emitting material | — | Ce:LuAG | Ce:YAG | Ce:YAG | Ce:YAG | Ce:YAG | Ce:YAG |
| | | Heat conductive material | — | Al2O3 | ZnO | Al2O3 | Al2O3 | Al2O3 | Al2O3 |
| | | Sintered ceramic phosphor | Ce:YAG | — | — | — | — | — | — |
| | | Thickness/μm | 100 | 100 | 100 | 100 | 100 | 50 | 2000 |
| Joining member | Resin type | | Thermosetting | Thermosetting | Thermosetting | Thermosetting | Thermosetting | Thermosetting | Thermosetting |
| | Material | | Silicone resin | Silicone resin | Silicone resin | Silicone resin | Polyethylene | Silicone resin | Silicone resin |
| | Continuous heat resistance temperature/° C. | | 170 | 170 | 170 | 170 | 120 | 170 | 170 |
| | Refractive index (550 nm) | | 1.43 | 1.43 | 1.43 | 1.43 | 1.49 | 1.43 | 1.43 |
| | X/Y | | 1/3 | 1/3 | 1/3 | 1/3 | 1/3 | 1/3 | 1/3 |
| Light collecting optical member | Shape | | Spherical lens | Spherical lens | Spherical lens | Double convex lens | Spherical lens | Spherical lens | Spherical lens |
| | Material | | BK7 | BK7 | BK7 | BK7 | BK7 | BK7 | BK7 |
| | Diameter/mm | | 3 | 3 | 3 | 3 | 3 | 3 | 3 |
| | Refractive index (550 nm) | | 1.52 | 1.52 | 1.52 | 1.52 | 1.52 | 1.52 | 1.52 |

TABLE 2-continued

|  |  | Example 8 | Example 9 | Example 10 | Example 11 | Example 12 | Example 13 | Example 14 |
|---|---|---|---|---|---|---|---|---|
| Light collection effect | Light emission diameter relative value | −0.3 | −0.31 | −0.33 | −0.1 | −0.24 | −0.32 | −0.32 |
|  | Determination | A | A | A | B | B | A | A |
| Light emission intensity | Fluorescence output/mW | 43 | 40 | 35 | 31 | 31 | 38 | 32 |
|  | Determination | A | A | B | B | B | B | B |
| Heat resistance | Ia/Ib | 0.94 | 0.92 | 0.93 | 0.91 | 0.9 | 0.93 | 0.92 |
|  | Determination | A | B | A | B | B | A | B |
| Overall determination |  | A | B | B | B | B | B | B |

TABLE 3

|  |  |  | Example 15 | Example 16 | Example 17 | Comparative Example 1 | Comparative Example 2 | Comparative Example 3 |
|---|---|---|---|---|---|---|---|---|
| Plate-shaped phosphor | MGC | Light emitting material | Ce:YAG | Ce:YAG | Ce:YAG | Ce:YAG | Ce:YAG | Ce:YAG |
|  |  | Heat conductive material | Al2O3 | Al2O3 | Al2O3 | Al2O3 | Al2O3 | Al2O3 |
|  | Sintered ceramic phosphor |  | — | — | — | — | — | — |
|  | Thickness/μm |  | 100 | 100 | 100 | 100 | 100 | 100 |
| Joining member | Resin type |  | Thermo-setting | Thermo-setting | Thermo-setting | — | Thermo-setting | Thermo-setting |
|  | Material |  | High heat resistance Silicone resin | Silicone resin | Silicone resin | — | Polyvinyl chloride | Silicone resin |
|  | Continuous heat resistance temperature/° C. |  | 200 | 170 | 170 | — | 79 | 170 |
|  | Refractive index (550 nm) |  | 1.43 | 1.43 | 1.43 | — | 1.52 | 1.43 |
|  | X/Y |  | 1/3 | 1/10 | 1/3 | — | 2/3 | 3/4 |
| Light collecting optical member | Shape |  | Spherical lens | Spherical lens | Aspherical double convex lens | — | Spherical lens | Spherical lens |
|  | Material |  | BK7 | BK7 | BK7 | — | BK7 | BK7 |
|  | Diameter/mm |  | 3 | 3 | 3 | — | 3 | 3 |
|  | Refractive index (550 nm) |  | 1.52 | 1.52 | 1.52 | — | 1.52 | 1.52 |
| Light collection effect | Light emission diameter relative value |  | −0.31 | −0.35 | −0.33 | 0 | −0.2 | −0.25 |
|  | Determination |  | A | A | A | C | B | B |
| Light emission intensity | Fluorescence output/mW |  | 41 | 30 | 39 | 45 | 38 | 29 |
|  | Determination |  | A | B | B | A | B | C |
| Heat resistance | Ia/Ib |  | 0.99 | 0.93 | 0.93 | 0.99 | 0.81 | 0.93 |
|  | Determination |  | A | A | A | A | C | A |
| Overall determination |  |  | A | B | B | C | C | C |

The followings can be seen from the results shown in Table 1, Table 2, and Table 3.

In all Examples, the light collecting optical member is joined to the plate-shaped phosphor, a refractive index of the light collecting optical member is higher than a refractive index of the Joining member, and the light collection effect is confirmed.

According to Example 1, Example 2, and Example 3, in a case where the collected excitation laser light is collected to a diameter of 1 mm, the light collection effect is recognized in a range in which the diameter of the light collecting optical member is 1 mm to 5 mm as the light collecting optical member.

From Example 1 and Example 4, the light collection effect is recognized in a range equal to or less than ⅔ of the light collecting optical member as the range of the height of the joining member.

From Example 1, Example 5, and Example 6, it can be seen that a material of the light collecting optical member is not limited, and may be silicon dioxide or a resin material.

From Example 1, Example 7, and Example 12, it can be seen that a material of the joining member is not limited, and a thermosetting resin or a thermoplastic resin in addition to the silicone resin may be used.

From Example 1 and Example 8, it can be seen that the plate-shaped phosphor may be the MGC phosphor or the sintered body.

From Example 1, Example 9, and Example 10, it can be seen that in a case where the plate-shaped phosphor is the MGC phosphor, the light emitting material may be Ce:YAG or Ce:LuAG, and the heat conductive material may be sapphire or zinc oxide.

From Example 1, Example 11, and Example 17, it can be seen that the light collecting optical member may be a spherical lens, a double convex lens, or an aspheric lens.

From Example 1, Example 13, and Example 14, it can be seen that the thickness of the plate-shaped phosphor may be 50 μm or more and 2,000 μm or less.

From Example 15, it can be seen that in a case where the continuous heat resistance temperature is high as the joining member, the heat resistance is particularly excellent.

From Example 16, it can be seen that in a case where a space exists between the plate-shaped phosphor and the convex surface of the light collecting optical member, a higher light collection effect can be obtained.

From Comparative Example 1, it can be seen that the light collection effect cannot be obtained only with the plate-shaped phosphor.

From Comparative Example 2, it can be seen that in a case where a resin having a low continuous heat resistance temperature is used as the joining member, heat resistance is inferior.

From Comparative Example 3, it can be seen that in a case where the height of the fillet of the joining member exceeds $2/3$ of the height of the light collecting optical member, the light emission intensity decreases.

In addition, in the present disclosure, any Example described above may be appropriately combined with each other, and the effect of each Example can be collectively exhibited.

According to the phosphor according to the present disclosure, the joining member has the fillet shape. Further, the height X of the fillet shape is equal to or less than $2/3$ of the maximum distance Y of the light collecting optical member. As a result, in a case where the plate-shaped phosphor is irradiated with laser light having a high output density, the spread of the light emission diameter caused by scattering of the light from the plate-shaped phosphor is collected by the joined light collecting optical member and suppressed. In this way, the phosphor having a high light collection effect can be obtained. Furthermore, due to the heat resistance of the joining member which joins the light collecting optical member and the plate-shaped phosphor, deterioration due to heat in the joint portion between the light collecting optical member and the plate-shaped phosphor is suppressed, and a phosphor which has a long life and in which light emission intensity and a high light collection effect are maintained can be obtained.

INDUSTRIAL APPLICABILITY

As described above, since the phosphor according to the present disclosure has a high light collection effect of fluorescence under irradiation with laser light having a high output density, can be a phosphor having a high light emission intensity, and has an excellent heat resistance, the phosphor according to the present disclosure is highly applicable to industrial fields.

REFERENCE MARKS IN THE DRAWINGS 10, 10a PHOSPHOR
11 PLATE-SHAPED PHOSPHOR
12 JOINING MEMBER
13 LIGHT COLLECTING OPTICAL MEMBER
14 HEAT CONDUCTIVE MATERIAL
15 LIGHT EMITTING MATERIAL
16 MONOMER LIQUID
17 SPACE (SPACE BETWEEN A PART OF CONVEX SURFACE OF THE LIGHT COLLECTING OPTICAL MEMBER AND THE PLATE-SHAPED PHOSPHOR)
18 MGC PHOSPHOR
21 LASER LIGHT
22 FLUORESCENCE

The invention claimed is:

1. A phosphor comprising:
a plate-shaped phosphor;
a joining member; and
a light collecting optical member having at least one convex surface and fixed to the plate-shaped phosphor by the joining member;
wherein the joining member forms a fillet shape between a surface of the plate-shaped phosphor to which the light collecting optical member is joined and the convex surface of the light collecting optical member, and
in a case where a height of the fillet shape from the surface of the plate-shaped phosphor to which the light collecting optical member is joined is set as a height X, and
a maximum distance of the light collecting optical member from the surface of the plate-shaped phosphor to which the light collecting optical member is joined is set as a maximum distance Y,
the height X is equal to or less than $2/3$ of the maximum distance Y.

2. The phosphor of claim 1,
wherein there exists a space on at least a part of a virtual perpendicular line that is drawn from at least one point of the convex surface to the surface of the plate-shaped phosphor to which the light collecting optical member is joined.

3. The phosphor of claim 1,
wherein the plate-shaped phosphor is a Melt Growth Composite (MGC) phosphor, and the MGC phosphor is formed by three-dimensionally combining a light emitting material which is a fluorescent material and a heat conductive material which is a metal oxide.

4. The phosphor of claim 3,
wherein the phosphor has a structure in which at least one of the light emitting material or the heat conductive material is a metal oxide, and in the metal oxide of the light emitting material, a metal element is replaced by a light emitting element.

5. The phosphor of claim 3,
wherein the light emitting material is a light emitting material in which Y3A15O12 is used as a base material and a part of Y elements are replaced by Ce elements or a light emitting material in which Lu3A15O12 is used as a base crystal and a part of Lu atoms in the base crystal are replaced by Ce elements, and the heat conductive material is A12O3 or ZnO.

6. The phosphor of claim 1,
wherein the plate-shaped phosphor is a sintered ceramic phosphor.

7. The phosphor of claim 6,
wherein the sintered ceramic phosphor is a light emitting material in which Y3A15O12 is used as a base material and a part of Y elements are replaced by Ce elements.

8. The phosphor of claim 1,
wherein the light collecting optical member is a spherical lens made of silicon dioxide.

9. The phosphor of claim 1,
wherein the joining member is a thermosetting transparent member or a thermoplastic transparent member.

10. The phosphor of claim 9, wherein the joining member is a silicone resin.

11. The phosphor of claim 1,
wherein a refractive index of the joining member is equal to or less than a refractive index of the light collecting optical member.

12. A method for producing a phosphor, the method comprising:
   a step of mixing a raw material powder of a light emitting material and a raw material powder of a heat conductive material and putting the mixture into a melting pot;
   a step of heating the melting pot to melt and mix the light emitting material and the heat conductive material;
   a step of cooling and solidifying the melted and mixed light emitting material and the heat conductive material by pulling up or pulling down to form a Melt Growth Composite (MGC) phosphor in which the light emitting material and the heat conductive material are combined three-dimensionally;
   a step of processing the MGC phosphor into a plate-shaped to form a plate-shaped phosphor;
   a step of attaching a transparent member to the plate-shaped phosphor or a light collecting optical member;
   a step of bringing the light collecting optical member and the plate-shaped phosphor into contact with each other via the transparent member; and
   a step of joining the light collecting optical member and the plate-shaped phosphor via the transparent member,
   wherein the transparent member is thermally melted and attached to the plate-shaped phosphor or the light collecting optical member, and the transparent member is cooled and solidified to join the light collecting optical member and the plate-shaped phosphor.

13. The method for producing the phosphor of claim 12,
wherein the transparent member has a liquid monomer, and the light collecting optical member and the plate-shaped phosphor are joined by curing the liquid monomer.

14. A method for producing a phosphor, the method comprising:
   a step of processing a sintered ceramic phosphor into a plate-shaped to form a plate-shaped phosphor;
   a step of attaching a transparent member to the plate-shaped phosphor or a light collecting optical member;
   a step of bringing the light collecting optical member and the plate-shaped phosphor into contact with each other via the transparent member; and
   a step of joining the light collecting optical member and the plate-shaped phosphor via the transparent member,
   wherein the transparent member is thermally melted and attached to the plate-shaped phosphor or the light collecting optical member, and the transparent member is cooled and solidified to join the light collecting optical member and the plate-shaped phosphor.

15. The method for producing the phosphor of claim 14,
wherein the transparent member has a liquid monomer, and the light collecting optical member and the plate-shaped phosphor are joined by curing the liquid monomer.

* * * * *